Nov. 5, 1968  A. VISCHER, JR  3,409,164
FORCE-PRODUCING MECHANISM FOR CONTROLLING THE
RELATIVE POSITION OF TWO MEMBERS
Filed Sept. 21, 1967  2 Sheets-Sheet 1
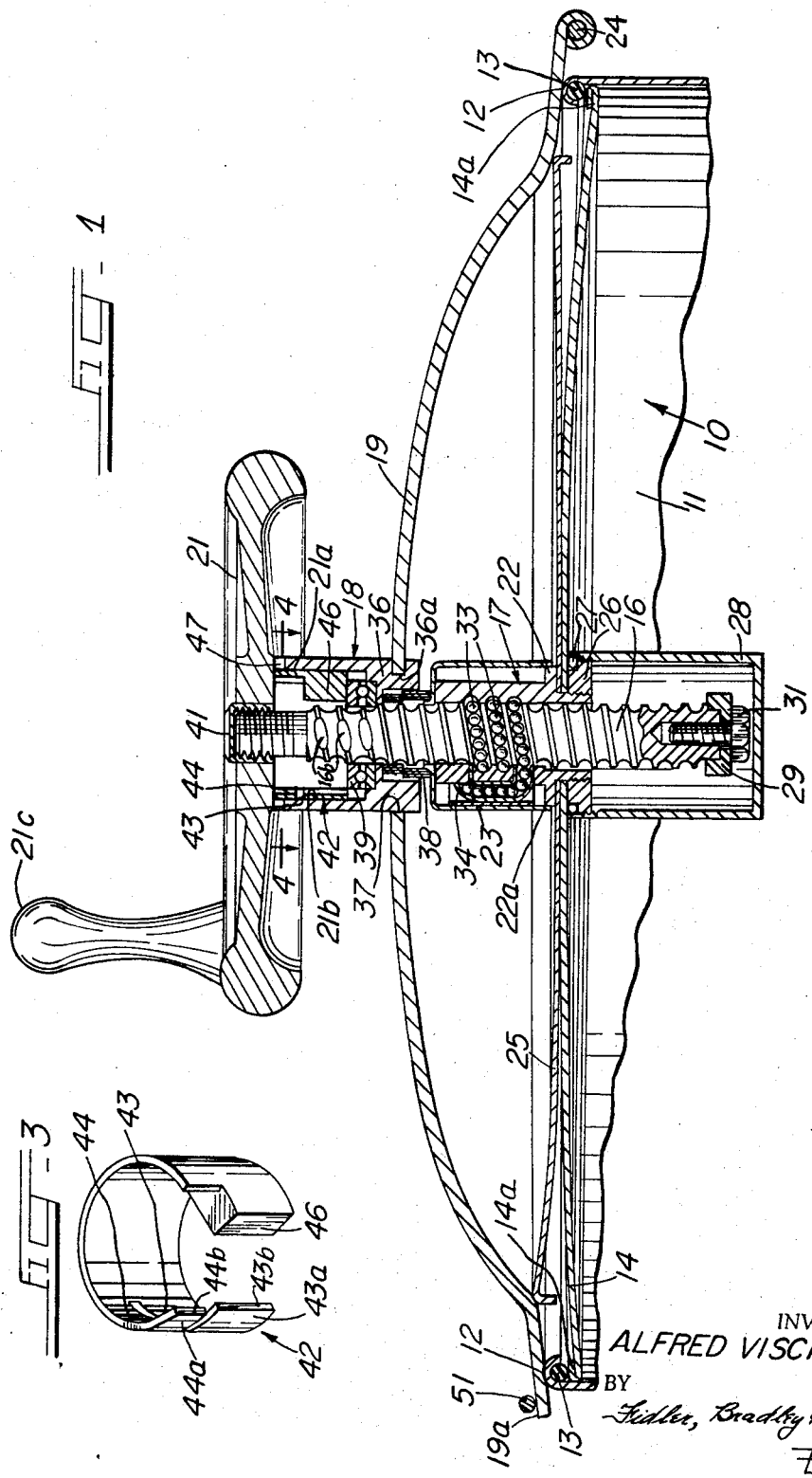
INVENTOR.
ALFRED VISCHER, JR.

Nov. 5, 1968 A. VISCHER, JR 3,409,164
FORCE-PRODUCING MECHANISM FOR CONTROLLING THE
RELATIVE POSITION OF TWO MEMBERS
Filed Sept. 21, 1967 2 Sheets-Sheet 2
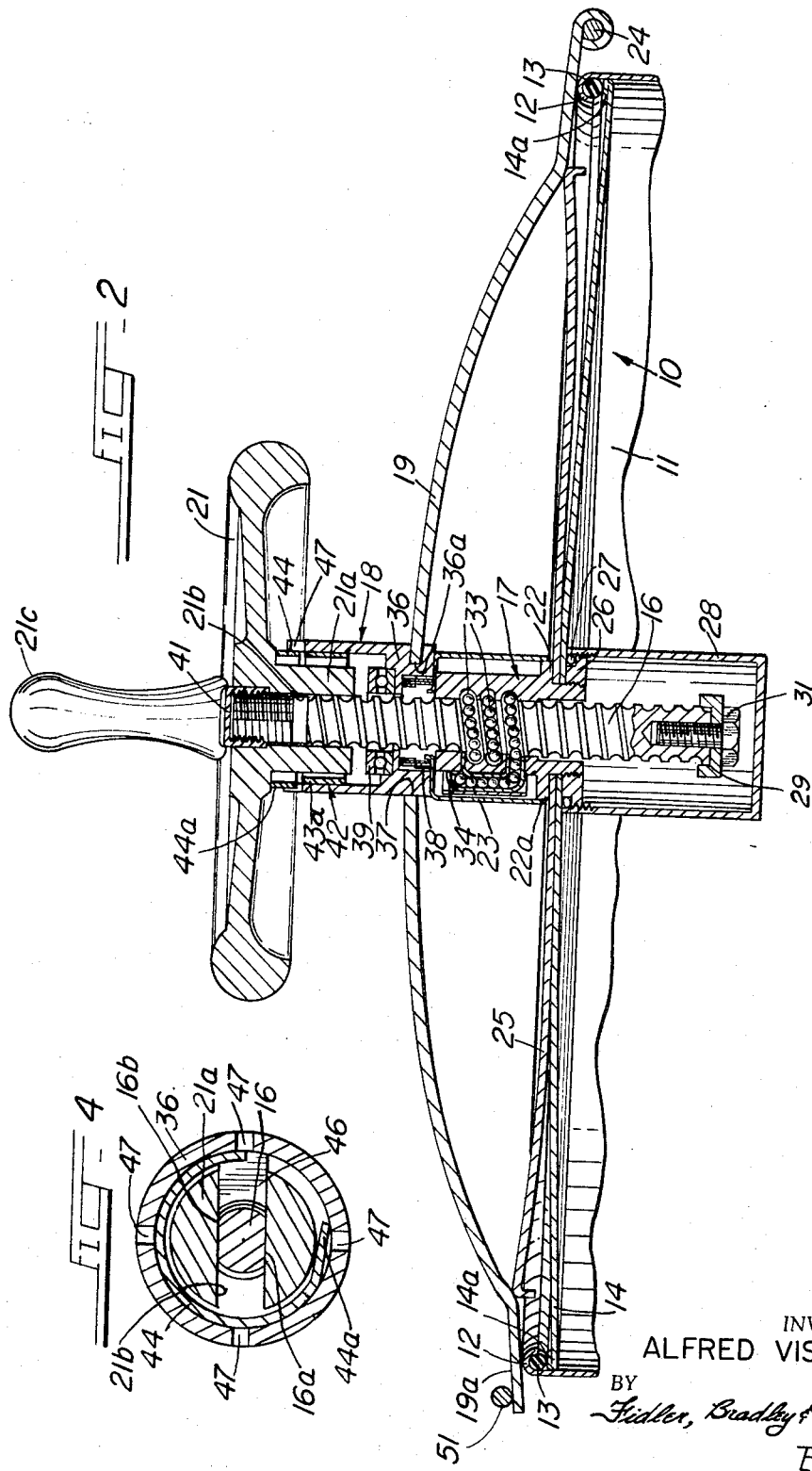
INVENTOR.
ALFRED VISCHER, JR.
BY
Fidler, Bradley & Patnaude
Attys.

United States Patent Office 3,409,164
Patented Nov. 5, 1968

3,409,164
FORCE-PRODUCING MECHANISM FOR CONTROLLING THE RELATIVE POSITION OF TWO MEMBERS
Alfred Vischer, Jr., Park Ridge, Ill., assignor of two-thirtieths each to William Vischer, Alfred Vischer III, and Peter Vischer; four-thirtieths each to Walter W. Zitzewitz and Elmer K. Zitzewitz; one-thirtieth each to Gertrude J. Zitzewitz and Barbara O. Zitzewitz; and two-thirtieths to Gertrude V. Bouton
Filed Sept. 21, 1967, Ser. No. 669,472
12 Claims. (Cl. 220—25)

ABSTRACT OF THE DISCLOSURE

A mechanism for flexing an unstressed cover into a stressed condition to seal a pressurizable vessel. The mechanism includes a manually-rotatable worm to move a ball nut fixedly mounted on the cover toward and away from an externally mounted brace. The mechanism includes a one-way brake in the form of a spring finger that resiliently bears against the inner wall of a housing to prevent the flexed cover from snapping open, and the brake further includes a separate finger which engages an irregularity in the housing to prevent manual rotation of the worm in a door opening direction when the vessel is pressurized.

---

The present invention relates in general to a new and improved mechanism for applying a force to provide relative movement between two members and to maintain such members in the selected relative positions, and it more particularly relates to a worm and nut arrangement incorporating a novel unidirectional braking and locking device.

Although the mechanism of the present invention finds application in many types of equipment and machinery, it is described herein in connection with the flexible cover or door of a pressure cooker. One such cover is described in U.S. Patent 2,282,011 and methods of making it are described in U.S. Patents 2,454,758 and 2,904,212.

This type of cover, when unstressed, projects an eliptical form and when stressed, projects a circular form. In use, the cover is placed in its unstressed condition on the inside of a circular opening having a diameter having a diameter intermediate the respective lengths of the major and minor axes of the cover. An outward force is then applied to the central portion of the cover which first pulls the peripheral portions of the cover in the vicinity of the major axis thereof against the rim of the opening and then flexes the cover into a circular shape wherein a continuous line of engagement is provided between the cover and the rim. This closing force must be maintained in order to prevent the internal stresses in the cover from returning it to its unstressed elliptical form. When used as the cover or door of a pressure cooker, this force may be maintained by the pressure within the cooking chamber.

Various mechanisms including levers and cams have been developed for providing a sufficient mechanical advantage to permit operation of this type of cover by manually applied forces. However, with the advent of relatively large doors with the associated larger forces, the prior art mechanisms are not altogether satisfactory. For example, with the prior art mechanisms, the cover operating mechanism could be moved to a cover open position after the cooking chamber was pressurized. The pressure in the chamber held the door closed until the pressure was relieved at the end of the cooking cycle, at which time the door would pop open. With smaller doors this was no problem and it had some advantages. In the case of the larger doors, however, the internal stresses in the cover are so great that excessive amounts of steam are released and damage to the operating mechanism is likely when the door pops open.

Therefore, an object of this invention is to provide a new and improved mechanism which can be used, among other things, for manually moving a flexible cover between an unstressed and stressed condition.

One mechanism for providing a sufficient mechanical advantage to permit an operator to manually close a large cover or door of the type above identified is a worm and nut assembly wherein the nut is fixed to the cover and a handwheel is provided on the worm. Preferably, a low friction connection between the nut and worm is achieved by the use of a ball nut thus enabling the operator to easily flex the cover to the circular shape. However, with such a connection, the longitudinal force exerted by the cover on the ball nut causes rotation of the worm. Consequently, if the operator were to release the handwheel before the pressure were built up in the cooking chamber, the door would pop open.

Therefore, in order to prevent the internal stresses in the door from opening it, there is provided a one-way brake which exerts a sufficient frictional force on the worm to prevent it from being rotated by the door itself. This brake is in the form of a semi-circular spring finger which is compressed within a cylindrical housing and it further includes a separate finger which engages an irregularity in the housing wall to prevent manual rotation of the handwheel in a door opening direction when the cooking chamber is pressurized.

Further objects and advantages of the present invention will become apparent as the following description proceeds, and the features of novelty which characterize the invention will be pointed out with particularity in the claims annexed to and forming a part of this specification. For a better understanding of the present invention, reference may be had to the accompanying drawings, wherein:

FIGURE 1 is a fragmentary front elevational view of a cover closing mechanism for a pressurizable vessel, embodying the present invention;

FIG. 2 is a fragmentary elevational view similar to FIG. 1 but showing the cover closing mechanism in its locked position;

FIG. 3 is a perspective view of a braking and locking spring for the cover closing mechanism in accordance with principles of the present invention; and FIG. 4 is a sectional view of the cover closing mechanism of FIG. 1 taken substantially along the line 4—4 thereof.

Referring now to the drawings, and particularly to FIGS. 1 and 2 thereof, there is shown a portion of a pressurizable vessel 10 comprising a cylindrically shaped vessel 11 having a circular access opening in the vessel as defined by an annular lip 12 which carries a resilient O-ring gasket 13. The gasket 13 thus provides a seat against which a flexible cover 14 is pressed to close and hermetically seal the vessel 11. The cover 14, which is preferably a thin, dished circular disk formed of stainless steel and containing internal warping stresses, has a peripheral lip or beaded edge 14a which strengthens the cover and engages the gasket 13 when the vessel 11 is sealed. The bead 14a is substantially elliptical in projection when the cover is in the warped unstressed state, and circular when the cover is unwarped. The cover 14 is illustrated in FIGS. 1 and 2 in its closed position in sealing engagement with the gasket 13, and hence the cover 14 is there shown in its circular unwarped condition. It should be understood that the vessel 11 and also the cover 14 with its cover closing mechanism are shown in FIGS. 1 and 2 for illustration purposes in a vertical orientation; whereas they are disposed in a horizontal orientation in actual use.

In order to provide the necessary manual force on the heavy cover 14 to flex it to its unwarped circular shape as shown in FIGS. 1 and 2, there is provided in accordance with this invention a manually operable worm 16, a ball nut assembly 17 threadably engaging the worm 16 and fixedly connected to the cover 14, a combination brake and lock assembly 18 fixedly connected to a pivotally mounted cross-brace 19, and a wheel 21 fixedly connected to one end of the worm 16 for manually rotating the worm 16.

Briefly considered, in sealing the vessel 11, the cover 14 is inserted through the opening in the vessel 11 by pivoting the brace 19 with a sideward motion. The wheel 21 is thence rotated in a clockwise direction so that the ball nut assembly 17 moves along the worm 16 and toward the brace 19. Since the cover is bowed about its midplane, the opposite portions of the periphery at the midplane are the first portions of the cover to bear against the gasket 13, and thereafter the cover 14 is flexed from the warped shape to the circular unwarped shape whereby an airtight seal is effected between the bead 14a and the gasket 13. By rotating the wheel 21 in a counterclockwise direction, the ball nut assembly 17 is moved along the worm 16 away from the brace 19, and thereby pushes the center of the cover 14 out of the closed unwarped position.

Considering in detail the ball nut assembly 17 and the worm 16 to effect a tight closure of the vessel 11, a threaded sleeve 22 extends through an opening in the cover 14 for receiving the worm 16. An annular flange portion 22a of the sleeve 22 is located on the external side of the cover 16 and is fixedly connected to the ball nut assembly 17 by any suitable means such, for example, as by welding or staking. A dust cover 23 for the ball assembly 17 is press-fitted over the flange portion 22a. The cross-brace 19 is pivotally mounted on a suitable pivot pin 24 provided in the supporting structure for the vessel 11 so that when the vessel 11 is opened by withdrawal of the cover 14 therefrom, the cross-brace 19 serves as a support for pivotally supporting the cover 14 in a position adjacent the opening in the vessel 11. A suitable compression leaf spring 25 disposed between the cover 14 and the cross-brace 19 forces the brake assembly 18 to ride firmly on the brace 19. In order to tightly secure the spring 25 to the cover 14, the spring 25 is provided with an opening which is aligned with the opening in the cover 14 to receive the sleeve 22 that extends through both of the aligned openings. The sleeve 22 has an outer wall inside of the vessel 11 which is threaded to receive a nut 26 so that the nut 26 can be tightened to secure the spring 25 and the cover 14 between the flange 22a of the sleeve 22 and the nut 26.

For the purpose of securing the nut 26 in sealing engagement with the cover 14, the nut 26 is provided with a recess about the periphery of one end thereof adjacent to the inner wall of the cover 14 for receiving an O-ring washer or gasket 27. In order to retain the gasket 27 within the recess of the nut 26, the remainder of the outer periphery of the nut 26 is threaded to receive a threaded inner wall of a cylindrical cover 28 that surrounds the entire periphery of the nut 26 and also the gasket 27. Consequently, the gasket 27 not only provides a seal for the nut 26 and the sleeve 22, but the gasket 27 also provides a seal for the chamber within the cover 28. Furthermore, the cover 28 receives and provides protection for the end of the worm 16 from the vapors and other matter within the vessel 11. Two holes (not shown) for a spanner wrench are provided in the nut 26 to fasten the cover 14 to the sleeve 22.

In order to prevent the worm 16 from being inadvertently withdrawn from the ball nut 17, the bottom end of the worm 16 is provided with a washer-like retainer plate 29, which fits over two flats on opposite sides of the end of the worm 16, within the cover 28. The retainer plate 29 is secured to the worm 16 by means of a hex-head screw 31 or other suitable means.

The ball nut assembly 17 is a conventional ball nut having a plurality of ball bearings 33 which provide a substantially frictionless movement of the worm 16 through the nut assembly 17. The ball bearings 33 continuously recirculate, in a known manner, by engaging several threads of the worm 16 and thence returning through a tube 34 to repeat the cycle.

The brake and lock assembly 18 will now be described in further detail. This assembly is provided with a housing 36 having a peripheral slot 36a near the bottom of its side walls so that the bottom of the housing 36 can be fitted into a complementary slot 37 in the cross-brace 19, whereby the peripheral slot 36a receives the cross-brace 19 to prevent axial movement of the housing 36 with respect to the cross-brace 19. For this purpose, the circular slot 37 has a flat to conform to the shape of the peripheral slot 36a in the housing 36. For the purpose of preventing dust, grease or other foreign material from accumulating on the worm 16, a telescopic dust cover 38 is provided which surrounds the worm 16 between the closed-end portion of the dust cover 23 and the lower wall of the housing 36. The telescopic dust cover 38, according to the preferred embodiment of the invention, is a volute spring. Accordingly, as the ball nut assembly 17 moves along the worm 16 away from the cross-brace 19, the spring 38 expands telescopically to provide the necessary protection for the portion of the worm 16 disposed between the brake and lock assembly 18 and the ball nut assembly 17.

A generally cylindrical hub 21a of the wheel 21 extends downwardly into the chamber of the bushing 36, and is bifurcated by means of a mill-cut slot 21b, as best shown in FIG. 4, to receive the external end of the worm 16 which is provided with a pair of flats 16a and 16b on opposite sides thereof. In order to facilitate rotation of the wheel and screw assembly, an annularly-shaped thrust bearing 39 is mounted between the bottom wall of the housing 36 and the lower end of the hub 21a as shown in FIG. 1. The wheel 21 is secured to the worm 16 by a cap nut 41 positioned in a counterbore on the wheel and threaded over the end of the worm 16. As shown, a handle 21c is connected to the handwheel 21.

The brake and lock assembly 18 further includes a braking means or spring generally indicated at 42, and best illustrated in FIGS. 3 and 4, which is located within the chamber of the housing 36. The locking spring 42 comprises a block portion 46 fitted to the hub 21a, and a pair of circularly-bent strips of spring metal which define a forward braking finger 43 and a rear locking finger 44, and which are integrally connected to the block 46. As shown in FIG. 3, the forward finger 43 is coextensive with the block 46, and at the portion of the finger 43 which is integrally connected to the block 46, the finger 43 is also integrally connected to the rear finger 44.

In order to cause the locking spring 42 to move in unison with the hub 21a, the block 46 is fitted within the slot 21b of the hub 21a, and has an arcuate face which is spaced from and confronts the worm 16. The fingers 43 and 44 wrap loosely around the outer surface of the hub 21a and include free end portions 43a and 44a, respectively, which are slightly tensioned to expand so as to frictionally engage the inner wall of the housing 36 for frictional engagement therewith. In order to snub the inner wall of the housing 36, when moved in a counterclockwise direction, the outer contour of the spring 42 is closely fitted to the inner wall of the housing 36. For the purpose of preventing the flexed or partially flexed cover 14 from snapping back to its unstressed condition and thereby spinning the wheel 21 in a counterclockwise direction, the spring 42 expands against the inner wall of the housing 36 with sufficient friction to prevent the worm 16 from rotating in a counterclockwise direction. However, when opening the cover 14 when the vessel 11 is not pressurized, a small additional manual rotational force applied to the handwheel 21 in a counterclockwise direction can readily overcome the force of the expanding spring. When the wheel 21 is rotated in the cover-flexing direction, clockwise as shown in the drawings, the block 46 forms the leading edge of the spring lock 42, and therefore the wheel is freely rotatable in a substantially frictionless manner because the spring is then tending to contract.

When the vessel 11 is pressurized which causes the cover 14 to be tightly held against the gasket 13, should the wheel 21 be rotated counterclockwise in the cover opening direction, the worm 16 backs out of the ball nut assembly 17, instead of causing the ball nut assembly to move along the worm 16 away from the brace 19 which would normally occur when the vessel 11 is not pressurized. Under such circumstances, the hub 21a backs out of the housing 36 which is anchored to the brace 19 which is in turn locked to the vessel 10 at 19a by a suitable latch including the pin 51, whereby the locking spring 42 moves with the hub 21a and therefore backs out of the housing 36. Therefore, since the spring lock 42 expands to its original untensioned shape upon leaving the housing 36, the brake and lock assembly tends to become disassembled. In order to prevent disassembly of the brake and lock assembly 18 and to prevent further counterclockwise rotation of the wheel 21, the locking spring 42 moves with the hub 21a and hence partially backs out of the housing 36, as illustrated in FIG. 2. The locking device 42 moves backwardly in a spiral path until the rear finger 44 snaps into and engages one of four notches 47, which are equally spaced about the rim of the housing 36. There are four equally-spaced notches 47, and the end of the rear finger 44a travels a distance of less than one-fourth of a revolution before engaging the closest one of the four notches 47 and prevents any further counterclockwise rotation of the wheel 21.

*Operation*

To flex the cover 14 from its normally unstressed condition to a stressed condition in which the cover 14 moves into sealing engagement with the gasket 13, the unstressed cover 14 is passed into the opening of the vessel 11 by rotating the brace 19 about the pivot 24 with a sideward motion, and the wheel 21 is then rotated clockwise in the cover-closing direction. Since the cover 14 is normally bowed about its horizontal midplane, the two extreme marginal edges along the midplane of the cover 14 are first pulled into engagement with the gasket 13. For the purpose of supplying a sufficient outwardly directed force to flex the cover 14 into its circular shape, the operator rotates the wheel 21 in a clockwise direction to cause the ball nut assembly 17 to move toward the cross-brace 19. Furthermore, the locking spring 42 rotates within the housing 36 in a clockwise direction with the block 46 forming the leading edge so that the wheel 21 can be freely rotated. Since the ball nut assembly 17 is fixedly connected to the cover 14, an outwardly directed force is applied at the central portion of the flexible cover 14 to flex the cover 14 into its circular stressed condition in sealing engagement with the gasket 13.

Should the operator release the wheel 21, the flexed or even partially flexed cover 14 would tend to snap into the unflexed condition which would cause a forwardly-directed force to be exerted on the ball nut assembly 17, and thereby tend to rotate the worm 16 in a counterclockwise direction. In order to prevent this rotation which would open the cover and also rapidly spin the wheel 21, the end portions 43a and 44a of the fingers 43 and 44, respectively, of the locking spring 42 are tensioned to resiliently engage and bear against the inner wall of the housing 36 to overcome the force exerted by the internal forces in the flexed cover 14.

In a normal pressure cooking cycle, after the cover 14 has moved into sealing engagement with the gasket 13, fluid under pressure enters the pressurizable vessel 11 and, when the pressure in the vessel builds up, it holds the cover in sealing engagement against the gasket 13 to hermetically seal the vessel. With pressure within the vessel 11, should someone rotate the wheel 21 in a counterclockwise direction in an attempt to open the cover 14, instead of the ball nut assembly moving away from the brace 19, the worm 16 backs out of the ball nut assembly 17. However, as the worm 16 backs out of the nut 17, the hub 21a of the wheel 21 backs out of the housing 36 and because of the friction between the slot 21b and the block 46, the spring 42 moves in a rearwardly-directed spiral and partially out of the housing 36. When the rear locking finger 44 of the spring 42 snaps into one of the four notches 47, further rotation of the wheel 21 in the counterclockwise direction is prevented.

Assume now that, following a normal cooking operation, the pressure within the vessel 11 is relieved and the operator desires to open the cover 14, the operator grasps the handle 21c and manually rotates the wheel 21. If the spring finger 44 had previously been moved into the locked position as shown in FIG. 2, the wheel 21 is first rotated a short distance in the clockwise direction until the spring finger 44 slips out of engagement with the notch 47, and then the wheel 21 is rotated in the counterclockwise direction, whereby the hub 21a of the wheel 21 and also the spring lock 42 move forwardly in unison into their normal position within the housing 36 as illustrated in FIG. 1.

The operator continues to rotate the wheel 21 until the cover is completely returned to its unstressed condition. Thereupon, in order to obtain access to the contents of the vessel, the cover 14, which is in its unstressed condition, is pulled out of the opening of the vessel 11 by a sideward motion of the brace 19.

While the invention has been described in connection with a particular embodiment thereof, it will be understood that various modifications may be made thereon which are within the true spirit and scope of the invention as defined in the appended claims.

What is claimed is:

1. A cover closing mechanism for flexing a cover into a stressed condition to sealably engage the rim of a pressurizable vessel and alternatively for enabling the internal stresses developed in said cover to return it to its unstressed, non-sealing condition wherein the improvement is:
   a ball nut fixedly connected to said cover;
   a worm rotatably mounted on the vessel and threadably engaging the ball nut for moving the central portion of said cover toward and away from said rim so that said cover may be moved into its stressed sealing condition; and
   unidirectional braking means connected between said worm and said vessel for exerting a frictional force on said worm exceeding the force exerted on the worm by the cover when in its stressed condition to prevent the internal stresses developed in said cover from returning it to its unstressed, non-sealing condition.

2. A cover closing mechanism according to claim 1, further including a locking means connected between said worm and said vessel for limiting rotation of said worm in the cover opening direction when said cover is held in the closed position by pressure within the vessel.

3. A cover closing mechanism according to claim 1, wherein said braking means includes a housing mounted on said vessel and a spring finger fixedly connected to said worm and mounted within said housing for resiliently engaging the inner wall of the housing to exert said frictional force on said worm only during rotation of the worm in the cover opening direction.

4. A cover closing mechanism according to claim 3, further including a locking means connected between said worm and said vessel for limiting rotation of said worm in the cover opening direction when said cover is held in the closed position by pressure within the vessel.

5. A cover closing mechanism according to claim 4, wherein said locking means is mounted within said housing and includes a second spring finger fixedly connected to said worm for engaging an irregularity on said housing to limit rotation of said worm in said cover opening direction.

6. A cover closing mechanism according to claim 5, wherein said second spring finger resiliently engages the inner wall of the housing, said housing being generally cup-shaped and said irregularity comprising a notch disposed at the rim of said housing for receiving the end portion of said second finger, whereby said second spring finger snaps into engagement with said notch to prevent said further rotation of said worm.

7. A cover closing mechanism according to claim 6, wherein said braking means and said locking means comprise a block fixedly connected to said worm to move in unison therewith and a pair of circularly bent strips of spring metal fixedly connected to said block to define said first and second fingers and tensioned to bear against the inner wall of said housing, said block being co-extensive with at least one of said springs.

8. A cover closing mechanism according to claim 7, further including manually rotatable means having a bifurcated cylindrical hub extending into said housing and fixedly engaging an end of the worm external to said vessel and also fixedly engaging said block with said first and second fingers wrapped about the outer wall of said hub so that said worm and said block move in unison with said manually rotatable means, said housing further including second, third, and fourth notches equally-spaced about the rim thereof, whereby after said rotating means rotates said worm in said cover opening direction while said cover is fixedly held in said given position, said hub causes said second spring finger to partially back out of said housing until said second finger snaps into engagement with the closest one of said notches to prevent further rotation of said manually rotatable means in said cover opening direction.

9. A brake and lock assembly for a force exerting mechanism, said mechanism having a ball nut mounted on a first member and a worm threadably engaging said ball nut for overcoming a force produced by said first member to move the first member and said ball nut toward a second member and also for returning said first member and said ball nut away from the second member, wherein the improvement resides in:

unidirectional braking means connected between said worm and said second member for exerting a frictional force on said worm in opposition to said force exerted by said first member on said ball nut, said frictional force being greater in magnitude than said force exerted by said first member thereby to prevent the force produced by said first member from returning it to its original position; and locking means connected between said worm and said second member for limiting rotation of said worm in the return direction when an external force is applied to said first member to hold said first member in a given fixed position.

10. A brake and lock assembly according to claim 9, further including a cup-shaped housing connected to said second member and including an irregularity therein, said braking means comprising a spring finger connected to said worm and mounted within said housing for resiliently engaging the inner wall of said housing, said locking means comprising a second spring finger connected to said worm and mounted within said housing for engaging said irregularity for preventing further rotation of said worm in the return direction.

11. A brake and lock assembly according to claim 10, wherein said braking means and said locking means comprise a block fixedly connected to said worm to move in unison therewith and a pair of circularly bent strips of spring metal fixedly connected to said block to define said first and second fingers and tensioned to bear against the inner wall of said housing, said block being co-extensive with at least one of said springs.

12. A brake and lock assembly according to claim 11, further including manually rotatable means having a bifurcated cylindrical hub extending into said housing and fixedly engaging an end of said worm and also fixedly engaging said block with said first and second fingers wrapped about the outer wall of said hub so that said worm and said block move in unison with said manually rotatable means, said irregularity in said housing comprising a plurality of notches about the rim of said housing, whereby after said first member is fixedly held in said given position and said rotating means rotates said worm in said return direction, said hub causes said second spring finger to partially back out of said housing until said second finger snaps into engagement with one of said notches to prevent further rotation of said manually rotatable means in said return direction.

References Cited

UNITED STATES PATENTS 2,456,134  12/1948  Lueneburg _____ 220—25

THERON E. CONDON, *Primary Examiner.*

G. T. HALL, *Assistant Examiner.*